(12) United States Patent
Stichowski et al.

(10) Patent No.: US 11,518,265 B2
(45) Date of Patent: Dec. 6, 2022

(54) METHOD FOR PROPOSING A CHARGING STRATEGY FOR AGING-OPTIMIZED CHARGING OF AN ENERGY STORE OF A MOTOR VEHICLE, CHARGING DEVICE AND MOTOR VEHICLE

(71) Applicant: Volkswagen Aktiengesellschaft, Wolfsburg (DE)

(72) Inventors: Torsten Stichowski, Magdeburg (DE); Ralf Borngräber, Lehre (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 106 days.

(21) Appl. No.: 17/244,402

(22) Filed: Apr. 29, 2021

(65) Prior Publication Data
US 2021/0362616 A1    Nov. 25, 2021

(30) Foreign Application Priority Data
May 19, 2020    (DE) ............... 10 2020 206 257.9

(51) Int. Cl.
*H02J 7/00*    (2006.01)
*B60L 53/62*    (2019.01)
(Continued)

(52) U.S. Cl.
CPC ............. *B60L 53/62* (2019.02); *B60L 58/12* (2019.02); *B60L 58/16* (2019.02); *H02J 7/007* (2013.01);
(Continued)

(58) Field of Classification Search
CPC ......... B60L 58/12; B60L 58/16; B60L 53/62; B60L 2240/54; B60Y 2200/91;
(Continued)

(56) References Cited

U.S. PATENT DOCUMENTS

| 2009/0015202 A1 | 1/2009 | Miura | 320/132 |
| 2009/0132186 A1* | 5/2009 | Esnard | G01R 31/3648 702/63 |

(Continued)

FOREIGN PATENT DOCUMENTS

| DE | 102012208609 A1 | 12/2012 | H01M 10/42 |
| DE | 102014220052 A1 | 4/2015 | B60L 11/18 |

(Continued)

*Primary Examiner* — Zixuan Zhou
(74) *Attorney, Agent, or Firm* — Slayden Grubert Beard PLLC

(57) ABSTRACT

The invention relates to a method for aging-optimized charging of an energy store of a motor vehicle, comprising: detecting a predetermined number of consecutive full charging processes of the energy store;
creating a use profile of the energy store on the basis of discharging processes of the energy store between the consecutive full charging processes;
determining whether the created use profile requires a full charging process as the next charging process, and, if the created use profile does not require a full charging process as the next charging process, proposing the charging strategy for the aging-optimized charging, wherein the charging strategy specifies a partial charging process of the energy store for at least the next charging process, in which the energy store is charged up to a predetermined partial charging limit of the operating capacity of the energy store that is smaller than the full charging limit.

20 Claims, 2 Drawing Sheets

(51) Int. Cl.
*B60L 58/12* (2019.01)
*B60L 58/16* (2019.01)
*B60K 6/28* (2007.10)

(52) U.S. Cl.
CPC ............ *B60K 6/28* (2013.01); *B60L 2240/54* (2013.01); *B60Y 2200/91* (2013.01); *B60Y 2200/92* (2013.01); *B60Y 2300/91* (2013.01)

(58) Field of Classification Search
CPC .. B60Y 2200/92; B60Y 2300/91; H02J 7/007; B60K 6/28
USPC .............................................. 320/109; 701/22
See application file for complete search history.

(56) References Cited

U.S. PATENT DOCUMENTS

| | | | |
|---|---|---|---|
| 2010/0019718 A1* | 1/2010 | Salasoo | B60L 58/15 |
| | | | 320/128 |
| 2012/0316810 A1 | 12/2012 | Syed et al. | 702/63 |
| 2013/0257381 A1* | 10/2013 | Diamond | B60L 58/12 |
| | | | 320/136 |
| 2015/0105947 A1 | 4/2015 | Chang et al. | 701/22 |
| 2015/0329003 A1 | 11/2015 | Li et al. | 320/134 |

FOREIGN PATENT DOCUMENTS

| | | | | |
|---|---|---|---|---|
| DE | 102013112678 A1 | 5/2015 | ........... | B60R 16/033 |
| DE | 102015208758 A1 | 11/2015 | ............. | B60L 50/16 |
| EP | 2645527 A1 | 10/2013 | ............. | B60L 11/18 |

\* cited by examiner

METHOD FOR PROPOSING A CHARGING STRATEGY FOR AGING-OPTIMIZED CHARGING OF AN ENERGY STORE OF A MOTOR VEHICLE, CHARGING DEVICE AND MOTOR VEHICLE

CROSS-REFERENCE TO RELATED APPLICATIONS

This application claims priority to German Patent Application No. DE 10 2020 206 257.9, filed on May 19, 2020 with the German Patent and Trademark Office. The contents of the aforesaid Patent Application are incorporated herein for all purposes.

TECHNICAL FIELD

The invention relates to a method for proposing a charging strategy for aging-optimized charging of an energy store of a motor vehicle, a charging device with a charger for charging an energy store of a motor vehicle, and a motor vehicle with an energy store and a charging device connected to the energy store.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The charge status, also referred to as 'state of charge' or short 'SOC', of an energy store is defined as the quotient of remaining capacity and operating capacity after the last full charge. The use of the energy store ages the energy store, wherein the operating capacity is reduced. The energy store ages particularly heavily when the energy store is always brought by charging to full states of charge in which the energy store is brought to a remaining capacity up to or near the operating capacity, i.e., to a 100% state of charge. This aging has a particularly pronounced effect in batteries, especially lithium ion batteries. For example, it is possible that the energy store is only charged up to a partial state of charge in which the energy store reaches a remaining capacity below the operating capacity, i.e., up to a state of charge of, for example, 80%. In the partial state of charge, the energy store ages more slowly and the operating capacity decreases more slowly.

Functions are implemented by means of which the user, in particular driver, of the motor vehicle can determine the state of charge to which the energy store of the motor vehicle should be charged. The user can therefore determine whether he needs a fully charged energy store for the coming drive or the coming drives until the next charging process. If he does not need a fully charged energy store and the associated range for driving the motor vehicle, climate control in the interior of the motor vehicle, etc. for the coming drive or the coming drives until the next charging process, he can specify a partial state of charge instead of the full state of charge, which is then achieved by means of a charging device. This brings the energy store to an aging-optimized partial state of charge.

It has been shown that this function is not always adopted by the users of the motor vehicle, and may not even be known to them. It can thus occur that the user always specifies full charging processes, which are then achieved by the charging device. Then the energy store is charged to a full state of charge, although the user does not even need this in typical use or planned use.

SUMMARY

An object exists to provide a method, a charging device, and a motor vehicle by means of which a longer service life of the energy store is possible.

The preceding object is solved by the subject matter of the independent claims. Embodiments of the invention are apparent from the dependent claims, the description and the drawings.

DESCRIPTION

Figure 1:
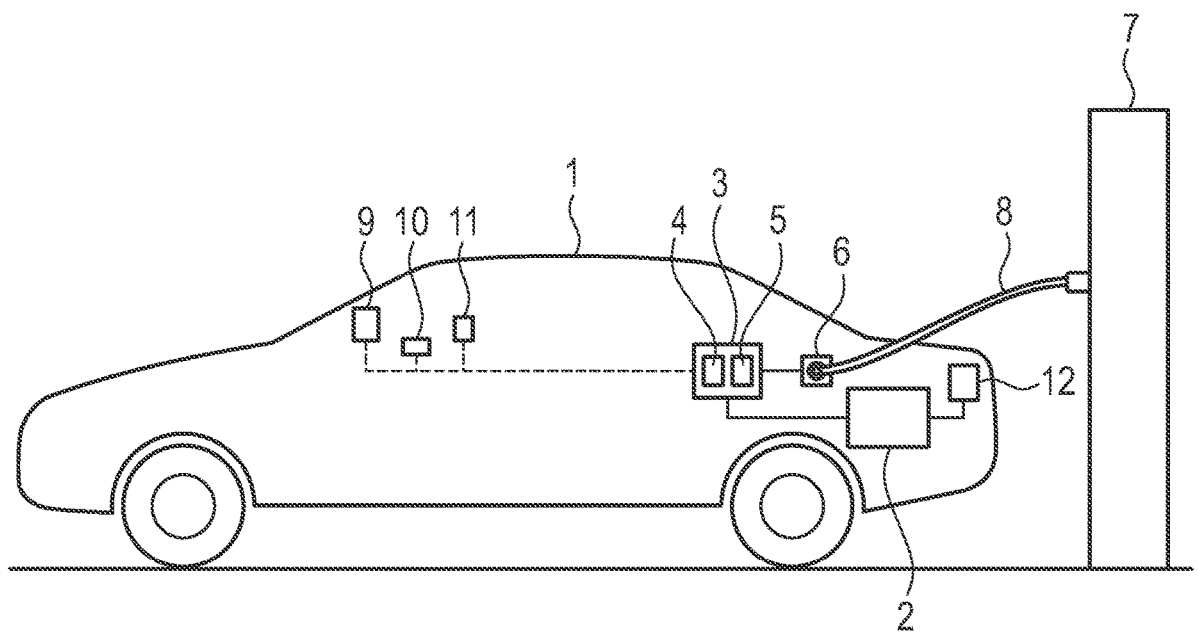
FIG. 1 shows a schematic representation of a motor vehicle according to an exemplary embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

It is noted that features and details that are disclosed in context with a method for proposing/suggesting a charging method may also apply to a charging device and to a motor vehicle, respectively, and vice versa.

According to a first exemplary aspect a method for proposing a charging strategy for aging-optimized charging of an energy store of a motor vehicle is provided, wherein the method has the following steps:
(a) detecting a predetermined number of consecutive full charging processes of the energy store in which the energy store has been charged in each case to a full state of charge with a predetermined full charging limit of an operating capacity of the energy store,
(b) creating a use profile of the energy store on the basis of discharging processes of the energy store between the consecutive full charging processes,
(c) determining whether the created use profile requires a full charging process as the next charging process, and, if the created use profile does not require a full charging process as the next charging process,
(d) proposing the charging strategy for the aging-optimized charging, wherein the charging strategy for at least the next charging process, in particular for the next charging processes, specifies a partial charging process of the energy store in which the energy store is charged up to a partial charging limit of the operating capacity of the energy store that is lower than the full charging limit.

Therefore, if the user has the predetermined number of consecutive full charging processes performed that are detected in step (a) of the above method and executed by a charging device, the energy store is charged this predetermined number of times up to the full state of charge. The method detects this predetermined number, ensuring that the method does not propose the charging strategy for the aging-optimized charging upon only one full charging process. Instead, the predetermined number may be at least two or, for example, at least five. The system can thus detect with high reliability by comparing with the use profile whether the user of the motor vehicle is aware that he may also specify a partial charging process instead of a full charging process in order to slow the aging of the energy store. A proposal of the charging strategy without a corresponding history of consecutive full charging processes, which could be perceived as disruptive by the driver, may thereby be prevented.

Correspondingly, it may be provided in some embodiments that the user may specify a partial charging process or a full charging process, which is then executed by the charging device. In this case, it may be provided for example that the user can specify the desired state of charge that should be achieved by the partial charging process, i.e., the partial charging limit. The user may, e.g., select the remaining capacity up to which the energy store should be charged in the partial charging process. In this case, the partial charging limit may, e.g., be displayed to him and be selectable and/or enterable as an achievable range or a percentage of the operating capacity or of the state of charge on a display, for example of the motor vehicle. The full charging limit does not necessarily have to correspond to a 100% state of charge in which the remaining capacity corresponds to the operating capacity. It may be provided in corresponding embodiments that the full charging limit deviates from a 100% state of charge by a predetermined deviation, for instance to protect the energy store. The full charging limit may correspond, for example, to 95% or 99% of the operating capacity.

In step (b) of the above method, the use profile of the energy store, or of the motor vehicle with the energy store, is created on the basis of discharging processes of the energy store between the consecutive full charging processes, for example as a result of the use of the motor vehicle, such as by drives with the motor vehicle. The use profile may be ascertained, for example, on the basis of the traveled driving distances or the energy consumption of the energy store between the consecutive full charging processes, which may be recorded for this purpose. The use profile may also be ascertained, for example, additionally or alternatively using an appointment calendar or specified driving distances or be supplemented therewith. In some embodiments, it may be detected in the created use profile how much energy the user of the motor vehicle has consumed in total or on average between the consecutive full charging processes.

In step (c) of the above method, it is determined whether the created use profile requires a full charging process as the next charging process. For example, in this step (c) it may be determined whether the created use profile requires full charging processes or full charging processes for a predetermined number of the next charging processes. This may take place by comparing the use profile, for example, in such a way that it is ascertained whether the user of the motor vehicle needed a full charging process for the use according to the use profile or always had a sufficient safety buffer of range or state of charge, for instance of at least 20% or at least 30% of the operating capacity, according to the use profile.

If the created use profile does not require a full charging process as the next charging process, or if the created use profile does not require full charging processes or the created use profile does not require full charging processes for a predetermined number of the next charging processes, a transition to step (d) of the method may occur. Otherwise, full charging processes continue to be performed or it is left to the user to decide whether he would like to have a partial charging process or full charging process executed as the next charging process.

In step (d) of the above method, the charging strategy for the aging-optimized charging is proposed, wherein the charging strategy specifies a partial charging process of the energy store for at least the next charging process or the next charging processes in which the energy store is charged up to a predetermined partial charging limit of the operating capacity of the energy store that is smaller than the full charging limit. For example, the charging strategy for the aging-optimized charging may specify partial charging processes for a predetermined number of the next charging processes or all of the next charging processes. In this case, it may for example be provided that the user may also specify a full charging process instead of the partial charging process specified by the charging strategy.

Correspondingly, by means of the method according to the present exemplary aspect, it is detected in a simple and reliable manner that a user has full charging processes performed even though he does not need a fully charged energy store in the everyday use of the motor vehicle. This detection allows the proposal of the aging-optimized charging strategy, which does not fully charge the energy store but rather charges it only up to a point that the user in particular may determine. The energy store is thus held in the full state of charge less often to never, which slows its aging and extends its service life. Since the charging strategy is only proposed, the user has full freedom to decide and may also select a full charging process instead of the proposed partial charging process, for example, in the case of an upcoming long drive.

The specification means, e.g., a process in which the charging device, the motor vehicle, or the user, for instance by means of an interface with the charging device or the motor vehicle, specifies a next charging process as a partial charging process or full charging process and it is then correspondingly executed by the charging device. In this case, the proposal means, e.g., a process in which the charging device, such as its control unit, or the motor vehicle makes a specification or recommends it to the user and in this respect leaves the specification to him. The user can then correspondingly implement the proposal as a specification or reject it.

The energy store in some embodiments may be a battery. The battery may be, for example, a lithium ion battery. The battery may, e.g., be the traction battery of the motor vehicle. The motor vehicle may correspondingly be an electric vehicle, for example a completely electrically driven motor vehicle, also known in English as a battery electric vehicle, for short: BEV, or a partially electrically driven motor vehicle with an electric charger, also known in English as a plug-in hybrid electric vehicle, for short: PHEV, but also a hydrogen vehicle, also known in English as a fuel cell vehicle, for short: FCV.

Since the state of charge is defined as the quotient of remaining capacity and operating capacity after the last full charge, the full state of charge in the case of a full charging process may relate to the operating capacity that is still available and not to an original operating capacity before or at the beginning of the use of the energy store.

In some embodiments, the method further has the step: detecting partial states of charge of the energy store between the consecutive full charging processes, up to which the energy store was discharged in each case by the discharging processes and from which the energy store is charged up to the full state of charge by means of one of the full charging processes in each case, and wherein the use profile of the energy store is created on the basis of the detected partial states of charge between the consecutive full charging processes. The partial states of charge before the full charging processes provide information about how much energy of the energy store was consumed in the drives with the motor vehicle between the consecutive full charging processes. By means of these partial states of charge, it can thus be very easily ascertained how far the user discharges the energy store between the consecutive full charging processes, and the use profile may be correspondingly created based on this. Accordingly, the use profile may contain all partial states of charge between the consecutive full charging processes.

In some embodiments it is determined that the created use profile does not require a full charging process as the next charging process, or no full charging processes, if none of the detected partial states of charge falls below a predetermined lower limit of the operating capacity of the energy store. This represents a particularly simple type of determination of whether or not a full charging process is required as the next charging process. In some embodiments, the partial states of charge are compared to the lower limit. If the user has not gone below the lower limit with the partial state of charge at any point in time in the use profile, it may then be very reliably inferred that the use profile does not require a full state of charge. The lower limit may be, for example, in a range from 20% to 80% or in a range from 30% to 80% of the operating capacity.

In some embodiments, the charging strategy for the aging-optimized charging is proposed as a message for a user of the motor vehicle and is configured such that the user may accept or reject the proposed charging strategy. The message may appear in particular on a display of the motor vehicle or of a unit coupled thereto, for example a smartphone. Consequently, the user may accept or reject the proposal. In some embodiments, a note can also be contained in the message that the detected aging-optimized charging strategy will perform the partial charging process instead of the full charging process, as a result of which the aging of the energy store can be reduced and this is recommended. It may also be noted and enabled in some embodiments that a full charging process may be specified by the user instead at any point in time in a control menu of the charging processes, or of the energy store of the motor vehicle.

In some embodiments, it may be provided that the charging strategy is configured such that the user can determine the partial charging limit for the partial charging process specified by the charging strategy. This may be provided for example in the message that appears on the display. In this way, the user may go into only a small restriction, for example specify a partial charging process only up to 90% or 95% instead of, for example, 80% of the operating capacity, and thus already reduce the aging of the energy store.

In some embodiments, it is ascertained before the specification of the partial charging process according to the charging strategy whether the next use of the motor vehicle corresponds to the use profile, and a full charging process is performed if the next use does not correspond to the use profile. The use profile may be compared to the next use, for example, through an input prompt on the part of the user or through an electronic calendar of the user. In the case of the input prompt, which can appear on the display, the driver may, for example, be prompted to indicate whether he will deviate from his usual use profile, which may be indicated to him at this point, for instance, in the form of the energy consumptions of the last days, or between the consecutive full charging processes. It may be provided, for example, that he may indicate a driving distance anticipated for the next use or one or more driving destinations, and it is calculated on this basis whether the use profile is maintained. Alternatively or additionally and in some embodiments, the electronic calendar of the user may be read out, which contains the driving destinations for the next use. Based on this, it may be prevented in some embodiments that a partial charging process is specified despite that fact that the user will deviate from the use profile and would have actually required a full charging process. This reduces the likelihood the motor vehicle to become stranded or making an undesired stop at a charging station.

In some embodiments, the partial charging limit for the partial charging process specified by the charging strategy is predetermined and is 90% or less of the operating capacity of the energy store. Nevertheless, it may for example be provided that the user may still change the specified partial charging limit independently.

In some embodiments, the predetermined number of consecutive full charging processes is at least three, in particular at least five. This prevents the user from constantly having the charging strategy recommended and being disrupted by this, although he had simply planned longer drives than actually performed or wanted to provide a safety buffer regarding the range of the motor vehicle. The proposal of the charging strategy for the aging-optimized charging may thereby reserved for cases in which the user of the motor vehicle does not know about the possibility of also only partially charging the energy store or does not know about the associated benefits and therefore always has performed full charging processes.

Another functionality may be provided in some embodiments in that the method is further configured to detect that the use profile requires full states of charge, for example when the user nearly or completely empties the energy store between the consecutive full charging processes, and to determine whether the user could charge the energy store between the consecutive full charging processes, for instance at home. This is intended to detect the case in which the user always completely or almost completely discharges the energy store but could also charge in between without great obstacles. If the user could also charge between the consecutive full charging processes from the low state of charge, it may be proposed accordingly as the aging-optimized charging strategy that the user charges before reaching the low state of charge, but only by means of a partial charging process. This prevents extensive discharges of the energy store and at the same time a full energy store, wherein both accelerates the aging of the energy store.

According to a second exemplary aspect, a charging device is provided with a charger for charging an energy store of a motor vehicle, wherein the charging device has a control unit that is configured to execute the method according to the first aspect or one or more of its embodiments.

According to a third exemplary aspect, a motor vehicle is provided with an energy store and a charging device according to the second aspect connected to the energy store.

It is noted that the method may provide additional steps that relate to the features of the charging device and the motor vehicle.

The motor vehicle may be for example a completely electrically driven motor vehicle (BEV), a partially electrically driven motor vehicle with an electric charger (PHEV), or a hydrogen vehicle (FCV) with an electric motor. The motor vehicle may have a charging socket connected to the charger for connecting to a charging station that delivers the energy or current for charging the energy store. Alternatively, the charging socket may be omitted in the case of another charging technology, for example inductive charging.

Additionally or alternatively to an integration of the control unit in the motor vehicle, it is possible in some embodiments that an, for example permanently installed charging station comprises the control unit. If a charging station of the user is used exclusively or primarily, a charging station comprising the control unit may also still detect the actual number of consecutive full charging processes sufficiently reliably.

In some embodiments, the motor vehicle has an interface connected to the control unit, which interface is configured such that a user may control the charging processes by means of the interface. For example, it may be provided that the user of the motor vehicle may set the charging limit of a charging process or all future charging processes. The interface may in this case be an operating unit of the motor vehicle and/or a wireless interface to an external device, for example a wirelessly connectable smartphone, tablet, or computer and an application or a program located thereon. The operating unit may be designed, for example, in the manner of an operating surface, for example as a touchscreen, or in the manner of an operating unit with mechanical buttons. By means of the operating unit or the application or program, the user may specify the next charging process himself based on his planned motor vehicle use. Thus, he may extend the service life of the energy store when he does not need a state of charge of 100% because he can foresee that his next drive or his next drives do not require the maximum range of the motor vehicle with the energy store fully charged before he can or would like to charge the energy store again.

In some embodiments, the user may reject a specification of a partial charging process of the control unit that specifies the charging strategy for the aging-optimized charging.

The display may in some embodiments be an optical display in the form of a screen, such as a touchscreen. Alternatively or additionally and in some embodiments, the display may also be an acoustic display in the form of a signal tone or an announcement. The display and the interface, both designed, for example, as a touchscreen, may be designed as one device. The display may be installed in the motor vehicle in some embodiments and/or for example be part of an external unit, for example a smartphone.

By means of the display and/or interface, the specification of the charging strategy may for example take place. It may be provided in some embodiments that the user may then confirm and/or reject the specification of the partial charging process. This may, e.g., take place by means of the interface. For the case in which the user does not confirm or reject the partial charging process, the control unit may be configured to once again specify the partial charging process for the next charging process. This prevents, on the one hand, the motor vehicle from performing a partial charging process against the wishes of the user, and, on the other hand, it is prevented that the user would like to refrain from a partial charging process and as a result the next partial charging process is temporally postponed.

In some embodiments, the control unit is connected to a route planner of the motor vehicle or is connected or can be connected to a vehicle-external route planner, wherein the control unit is configured to furthermore only specify a partial charging process when a route of the route planner can also be traveled with an energy store charged only by means of the partial charging process.

The route planner may be, for example, the navigation unit of the motor vehicle, in which the user enters his destination or his destinations for the next drive or the next day and a route is calculated. In this case, the route may be a continuous route with multiple destinations, i.e., comprise multiple drives. Accordingly, a route is understood as the path to be traveled between two consecutive full charging processes.

The route planner may, however, also be an intelligent route planner that has, for example, access to the electronic calendar and appointments of the user of the motor vehicle or comprises these. The route planner may be, for example, a smartphone, tablet, or computer with a corresponding application or a program. The user may configure the functionality accordingly, for instance by enabling an electronic calendar of the smartphone, tablet, or computer.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation of a motor vehicle 1 according to an exemplary embodiment. The motor vehicle 1 is designed presently as an electric vehicle with an electric motor 12.

The electric motor 12 is configured to drive the motor vehicle 1 and is connected to an energy store 2. The energy store 2 delivers electrical energy to the electric motor 12. To charge the energy store 2, the motor vehicle 1 has a charging device 3 and a charger 5. The charger 5 is connected to a charging station 7 in the form of a charging pole by means of a charging socket 6 of the motor vehicle 1 and a charging cable 8 connected thereto. This allows the energy store 2 to be charged with electrical energy.

A control unit 4 of the charging device 3 controls the charger 5 and the charging process of the charging of the energy store 2. The control unit 4 can specify to the charger 5 either a full charging process VV or a partial charging process TV (see FIG. 2 and the explanation based thereupon in the following). The charger 5 will execute this during the next charging process.

For the full charging process VV, the energy store 2 is charged up to a full state of charge VZ. For the partial charging process TV, on the other hand, the energy store 2 is charged only up to a partial state of charge TZ of, for example, 80% of the operating capacity of the energy store 2. This holds the state of charge in a range below the full state of charge VZ of 100% of the operating capacity in order to extend the service life of the energy store 2.

A display 9, an interface 10, and a route planner 11 are connected to the charging device 3. The display 9 enables the respective charging process to be displayed. By means of the interface 10, one of the two charging processes, i.e. full charging process VV or partial charging process TV, may be selected by the user of the motor vehicle 1. The route planner 11 enables the control unit 4 to ascertain using one of this established route whether a full charging process VV is necessary to complete this route before the next charging process, or a partial charging process TV is sufficient to complete this route, so that the energy store 2 does not need to be fully charged and its service life is not unnecessarily decreased.

Figure 2:
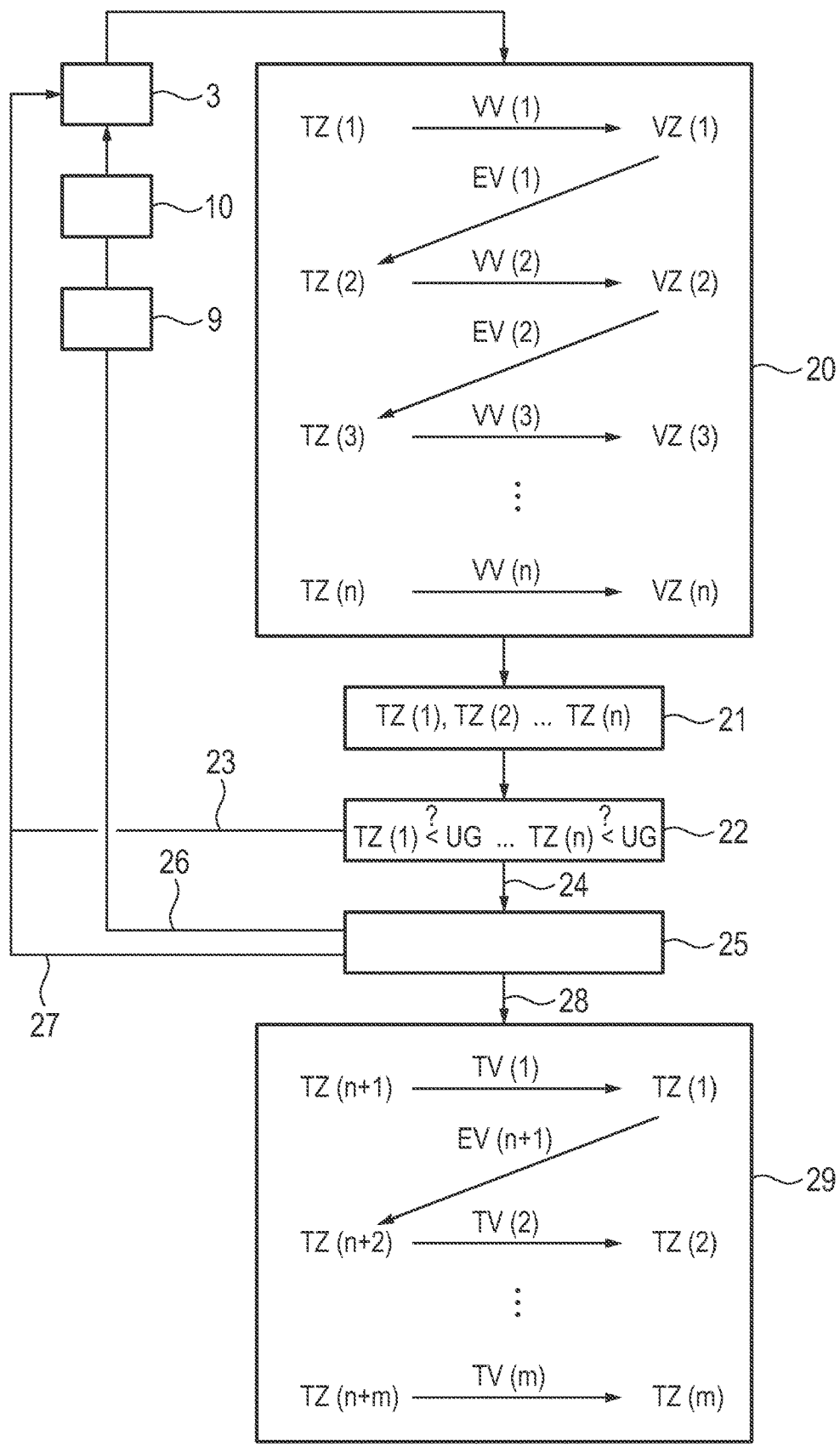
FIG. 2 shows a schematic representation of a method for proposing a charging strategy for aging-optimized charging of an energy store of the motor vehicle from FIG. 1 according to an exemplary embodiment.

FIG. 2 shows a schematic representation of a method for charging the energy store 2 of the motor vehicle 1 from FIG. 1 according to an exemplary embodiment.

By means of the interface 10, a first full charging process VV(1) is selected by the user or driver of the motor vehicle 1 or is thus specified by the motor vehicle 1, for instance as a factory setting. The control unit 4 of the charging device 3 specifies this full charging process VV(1) to the charger 5 and the charger 5 charges the energy store 2 by means of the charging station 7 from a partial state of charge TZ(1) to a full state of charge VZ(1).

If the user does not change the setting of the specification of full charging processes VV by means of the interface 10, which allows the charging processes to be set on the display 9, the energy store 2 is fully charged during each charging process. In other words, consecutive full charging processes VV(1), VV(2), VV(3) ... VV(n), i.e. those that are temporally directly one after the other, are performed. As long as the user does not change this setting by means of the interface 10, the full charging processes VV continue to be executed. However, if the user of the motor vehicle 1 does not fully empty or also only nearly empties the energy store 2 and/or seldom has the motor vehicle 1 in operation, the energy store 2 is frequently in a full state of charge VZ or a state of charge near the full state of charge VZ. This, however, is not optimal, since it ages the energy store 2 more quickly.

Therefore, in the method a predetermined number n of consecutive full charging processes VV(1) ... VV(n) is first detected in the first block 20. In this case, in addition to the number n of the consecutive full charging processes VV, the partial states of charge TZ(1) ... TZ(n) are also detected, each of which are reached from the full charging processes VV(1) ... VV(n) after the discharging processes EV(1) ... EV(n) through drives with the motor vehicle 1.

After detecting this predetermined number n, which may be, for example, five, a transition to the second block 21 occurs which represents a use profile 21 of the energy store 2. The use profile 21 stores all partial states of charge TZ(1) ... TZ(n) between the full charging processes VV from which the energy store 2 is charged.

In the third block 22, a determination of whether the created use profile 21 requires a full charging process VV as the next charging process takes place. For this purpose, it is checked for each of the detected partial states of charge TZ(1) ... TZ(n) of the use profile 21 whether this is below a predetermined lower limit UG of the operating capacity of the energy store 2. If this is the case, full charging processes VV continue to be performed or, according to the first instruction 23, charging continues to take place according to the specification of the charging device 3. However, if none of the detected partial states of charge TZ are below the lower limit UG, then it goes on to the fourth block 25 according to the second instruction 24.

In the fourth block 25, a charging strategy 29 is proposed to the user on the display 9, which appears here according to a third instruction 26 as a message on the display 9. The charging strategy 29 is intended to enable aging-optimized charging if according to the use profile 21 the next charging process does not have to be a full charging process VV, which is determined by the second instruction 24 from the third block 22.

However, instead of directly specifying the charging strategy 29, the user is offered the possibility of accepting or rejecting the proposed charging strategy 29 by means of the interface 10. If the user rejects the proposed charging strategy 29, charging will continue according to a fourth instruction 27 according to the specification of the charging device 3. Upon acceptance of the charging strategy 29 by the fifth instruction 28, charging takes place according to this.

In this case, charging takes place from the partial state of charge TZ(n+1) through partial charging process TV(1) to a partial state of charge TZ(1). By driving with the motor vehicle 1, the energy store (2) is discharged from the partial state of charge TZ(1) by means of the discharging process EV(n+1) and reaches the partial state of charge TZ(n+2). As long as the user does not change the specification of partial charging processes TV, this specification carries on and partial charging processes TV(1) ... TV(m) are performed.

To illustrate the method using an example, it shall be assumed that the number n of the consecutive full charging processes VV is three. By way of example, the partial states of charge before the consecutive full charging processes VV(1), VV(2), VV(3) TZ(1)=58%, TZ(2)=79%, TZ(3)=83% and TZ(4)=47% of the operating capacity of the energy store 2. If the lower limit UG has now been predetermined at 50%, then TZ(4)<UG and therefore the first instruction 23 proceeds so that the charging strategy 29 is not proposed. On the other hand, if the lower limit UG is predetermined at 40%, then none of the partial states of charge TZ(1) ... TZ(4) fall below the lower limit UG. The charging strategy 29 is proposed on the display 9 and also specified if the user accepts this by means of the interface 10 or at least does not reject it. From then on, aging-optimized partial charging processes TV are specified and performed.

LIST OF REFERENCE NUMERALS

1 Motor vehicle
2 Energy store
3 Charging device
4 Control unit
5 Charger
6 Charging socket
7 Charging station
8 Charging cable
9 Display
10 Interface
11 Route planner
12 Electric motor
20 First block
21 Second block, use profile
22 Third block
23 First instruction
24 Second instruction
25 Fourth block 26 Third instruction
27 Fourth instruction
28 Fifth instruction
29 Charging strategy
TV Partial charging process
TZ Partial state of charge
VV Full charging process
VZ Full state of charge
EV Discharging process
n Number of consecutive full charging processes
m Number of consecutive partial charging processes
UG Lower limit The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for proposing a charging strategy for aging-optimized charging of an energy store of a motor vehicle, wherein the method has the following steps:
   detecting a predetermined number of consecutive full charging processes of the energy store in which the energy store has been charged in each case to a full state of charge with a predetermined full charging limit of an operating capacity of the energy store;
   creating a use profile of the energy store on the basis of discharging processes of the energy store between the consecutive full charging processes;
   determining whether the created use profile requires a full charging process as the next charging process; and
   if the created use profile does not require a full charging process as the next charging process, proposing the charging strategy for aging-optimized charging, wherein the charging strategy specifies a partial charging process of the energy store for at least the next charging process, in which the energy store is charged up to a predetermined partial charging limit of the operating capacity of the energy store that is smaller than the full charging limit.

2. The method of claim 1, wherein the method further comprises the step: detecting partial states of charge of the energy store between the consecutive full charging processes, up to which the energy store was discharged in each case by the discharging processes and from which the energy store is charged up to the full state of charge by means of one of the full charging processes in each case, and wherein the use profile of the energy store is created on the basis of the detected partial states of charge between the consecutive full charging processes.

3. The method of claim 2, wherein it is determined that the created use profile does not require a full charging process as the next charging process if none of the detected partial states of charge falls below a predetermined lower limit of the operating capacity of the energy store.

4. The method of claim 1, wherein the charging strategy for the aging-optimized charging is proposed as a message for a user of the motor vehicle and is configured such that the user can accept or reject the proposed charging strategy.

5. The method of claim 4, wherein the charging strategy is configured such that the user can determine the partial charging limit for the partial charging process specified by the charging strategy.

6. The method of claim 4, wherein it is determined before the specification of a partial charging process according to the charging strategy whether the next use of the motor vehicle corresponds to the use profile, and a full charging process is performed if the next use does not correspond with the use profile.

7. The method of claim 1, wherein the partial charging limit for the partial charging process specified by the charging strategy is predetermined and is 90% or less of the operating capacity of the energy store.

8. The method of claim 1, wherein the predetermined number of the consecutive full charging processes is at least three.

9. A charging device with a charger for charging an energy store of a motor vehicle, wherein the charging device has a control unit that is configured to execute the method of claim 1.

10. A motor vehicle with an energy store and a charging device according to claim 9 connected to the energy store.

11. The method of claim 2, wherein the charging strategy for the aging-optimized charging is proposed as a message for a user of the motor vehicle and is configured such that the user can accept or reject the proposed charging strategy.

12. The method of claim 3, wherein the charging strategy for the aging-optimized charging is proposed as a message for a user of the motor vehicle and is configured such that the user can accept or reject the proposed charging strategy.

13. The method of claim 5, wherein it is determined before the specification of a partial charging process according to the charging strategy whether the next use of the motor vehicle corresponds to the use profile, and a full charging process is performed if the next use does not correspond with the use profile.

14. The method of claim 2, wherein the partial charging limit for the partial charging process specified by the charging strategy is predetermined and is 90% or less of the operating capacity of the energy store.

15. The method of claim 3, wherein the partial charging limit for the partial charging process specified by the charging strategy is predetermined and is 90% or less of the operating capacity of the energy store.

16. The method of claim 4, wherein the partial charging limit for the partial charging process specified by the charging strategy is predetermined and is 90% or less of the operating capacity of the energy store.

17. The method of claim 5, wherein the partial charging limit for the partial charging process specified by the charging strategy is predetermined and is 90% or less of the operating capacity of the energy store.

18. The method of claim 6, wherein the partial charging limit for the partial charging process specified by the charging strategy is predetermined and is 90% or less of the operating capacity of the energy store.

19. The method of claim 2, wherein the predetermined number of the consecutive full charging processes is at least three.

20. The method of claim 3, wherein the predetermined number of the consecutive full charging processes is at least three.

* * * * *